United States Patent [19]
Weissman

[11] Patent Number: 5,694,212
[45] Date of Patent: Dec. 2, 1997

[54] METHOD FOR CALIBRATING SPECIMEN WITH SPECIMEN HOLDER OF A MICROSCOPE

[75] Inventor: Mark Weissman, Wayland, Mass.

[73] Assignee: Compucyte Corporation, Cambridge, Mass.

[21] Appl. No.: 492,847

[22] Filed: Jun. 20, 1995

[51] Int. Cl.[6] .............................. G01J 1/02; G01B 11/00; G01B 21/00; G02B 21/26
[52] U.S. Cl. ...................... 356/237; 356/243; 356/375; 356/394; 356/400; 359/393; 359/397
[58] Field of Search .................................. 356/399–401, 356/237, 375, 246, 243, 394; 359/368, 393, 397

[56] References Cited

U.S. PATENT DOCUMENTS

| | | | |
|---|---|---|---|
| 4,055,376 | 10/1977 | Daberko | 359/368 |
| 5,000,554 | 3/1991 | Gibbs | 359/393 |
| 5,367,401 | 11/1994 | Saulietis | 356/246 |
| 5,499,097 | 3/1996 | Ortyn et al. | 356/375 |

Primary Examiner—Frank G. Font
Assistant Examiner—Jason D. Vierra Eisenberg
Attorney, Agent, or Firm—Graham & James LLP

[57] ABSTRACT

A method and device for the calibration of microscope slides for use in accurate and repeatable position location and relocation of specific areas of a specimen on the slide, particularly with use of computer correlated location of specimen events. Deviation from orthogonality of a specimen holder positioned on a stage (relative to movement of the microscope slide stage) is determined and compensated for by means of a rectangular calibration slide having a predetermined fixed length diagonal, and visual fixation sites at the ends of the diagonal, i.e., opposite corners of the slide, for the position marking of the corners and determination of the diagonal and its position. The calibration slide is placed on the microscope stage, against a fixed position portion of the slide holder. The viewfinder of the lens is then moved to superimpose and enter a calibration mark directly on two opposite corners of the calibration slide, or on location marks on the calibration slide which are a pre-set distance from such opposite corners. Entry of the corner positions locates a diagonal line of the appropriate length and of a particular slope, relative to the x-y axes of microscope stage movement. Deviation of the obtained slope from a predetermined slope for a true orthogonal position for the slide, is calculated and used to compensate for deviations in locating and relocating areas on a specimen subsequently positioned on the specimen holder.

9 Claims, 5 Drawing Sheets

METHOD FOR CALIBRATING SPECIMEN WITH SPECIMEN HOLDER OF A MICROSCOPE

FIELD OF THE INVENTION

This invention relates to methods for the quality control microscope re-examination of specimens, and review of areas of interest thereon, and particularly to specimens on microscope slides, wherein information with respect to the original examination is recorded and stored by computer.

BACKGROUND OF THE INVENTION

Microscope slides having pathology specimens thereon have been manually screened and re-screened without regard or even any need for exact placement of the slide on a microscope slide holder. With standard manual examination, slides are physically marked, such as with dots, to indicate events of interest. Mapping of the slide such as with grids for sector location, requires only a simple alignment for calibration. This is usually effected by initially moving markings in the lens eyepiece into alignment with a landmark on the slide, most often an upper corner of the slide.

With the advent of computerized systems, such as the HOME system, for use in slide analysis, screening and re-examination, slide position calibration is a direct function of the system which includes the particular microscope being utilized. Accordingly, the system is designed such that slides can only be properly positioned relative to the computer scanning and for information retrieval.

It has been believed that microscopes used professionally such as in commercial laboratories, hospitals and the like, are built to close tolerances whereby slides placed on different microscopes, even of different manufacturers, if properly positioned, are always orthogonal to the x-y axes in which the microscope slide stages are movable, i.e., the top and bottom edges of the slide are parallel to the x-axis and the right and left sides of the slide are parallel to the y-axis. Accordingly, calibration has been effected in the prior art normal manner of alignment of a calibration mark with a slide landmark such as the aforementioned upper corner of the slide. It has however been discovered that while the slide holder of professional microscopes is built to close tolerances, the manner in which such holders or other types of specimen holders are affixed to the microscope stages allows for slight, almost imperceptible (particularly at the corner calibration points) deviations from true orthogonality of the holder relative to the stage, with up to several millimeters of deviation towards the center of a slide held by the holder and in the specimen mounted thereon, and/or specimen otherwise held without a slide. This is of little or no consequence with respect to the normal use for which these microscopes are designed. However, when such microscopes are linked to computer systems, such as described in co-pending application No. 08/089,243, wherein computers provide location points of the specimen being examined, corresponding to particular fields of view (based on an absolute of true orthogonality), deviations of only several millimeters can actually result in locations of the specimen, designated by the computer, being outside of the actual field of view.

The standard calibration method of the prior art of focussing cross-hairs on a corner of the slide or other location point on a specimen itself, while effective for locating a starting point for scanning, has however been discovered to be insufficient to correct for deviations from orthogonality. For example, at the normal calibrating position of the upper corners of a slide, deviations are often visibly imperceptible and are thus unaccounted for.

It is accordingly an object of the present invention to provide an economical yet accurate means for determining deviations from orthogonality, of specimen holders and the items held thereby (slides or specimens) which are affixed to the movable stage of any microscope, from the x-y axes of movement of the stage of such microscope.

It is another object of the present invention to provide further means for using the determined deviation as a calibration for accurate location and relocation of computerized specimen location sites based on true orthogonality.

These and other objects, features and advantages will become more evident from the following discussion and drawings in which:

SHORT DESCRIPTION OF THE DRAWINGS

SUMMARY OF THE INVENTION

Generally the present invention comprises a method and device for the orthogonal calibration of holders for specimens and slides having specimens thereon (hereafter collectively referred to as specimens) placed on microscope stages which are movable in an x-y axes plane and with the location calibration of specimens held by said holders. The method and device provide calibration means for accurate and repeatable position location and relocation of specific areas of a specimen, particularly with use of computer correlated location of specimen events. In accordance with the method of the present invention, repeatable position location on a specimen, relative to microscope viewing areas is effected by the steps of:

a. determining the deviation of a specimen holder on the microscope stage from orthogonal positioning thereof relative to the x-y axes of the movement of the stage; and b. utilizing the determined deviation to calibrate a specimen, held by the holder, relative to computer stored location of viewing areas of the specimen, based on initial orthogonal placement of the specimen relative to the x-y axes of the stage movement.

A device suitable for use in effecting the aforementioned method comprises a calibration slide of predetermined diagonal length and slope (relative to an orthogonal position). The calibration slide is used with computer means programmed with said diagonal length and slope. The device further comprises means for marking two points on or at the ends of the diagonal of the calibration slide (preferably for the same diagonal as the predetermined diagonal, though the other diagonal can be properly correlated as well), as positioned on the specimen holder of a microscope stage, or at two points on the slide which are a predetermined relative distance from the diagonal, whereby diagonal length and slope, as positioned, is determinable by the computer means. The computer means is programmed to compare the stored orthogonally positioned value of slope to that of the actual slope value, as determined, and to generate a correction or calibration factor. The correction or calibration factor is then used by the computer means to provide a matching correlation between computer location on the specimen of sites (based on originally orthogonal based-entry), with actual viewable sites on the specimen.

DETAILED DESCRIPTION OF THE DRAWINGS AND THE PREFERRED EMBODIMENT

Figure 1:
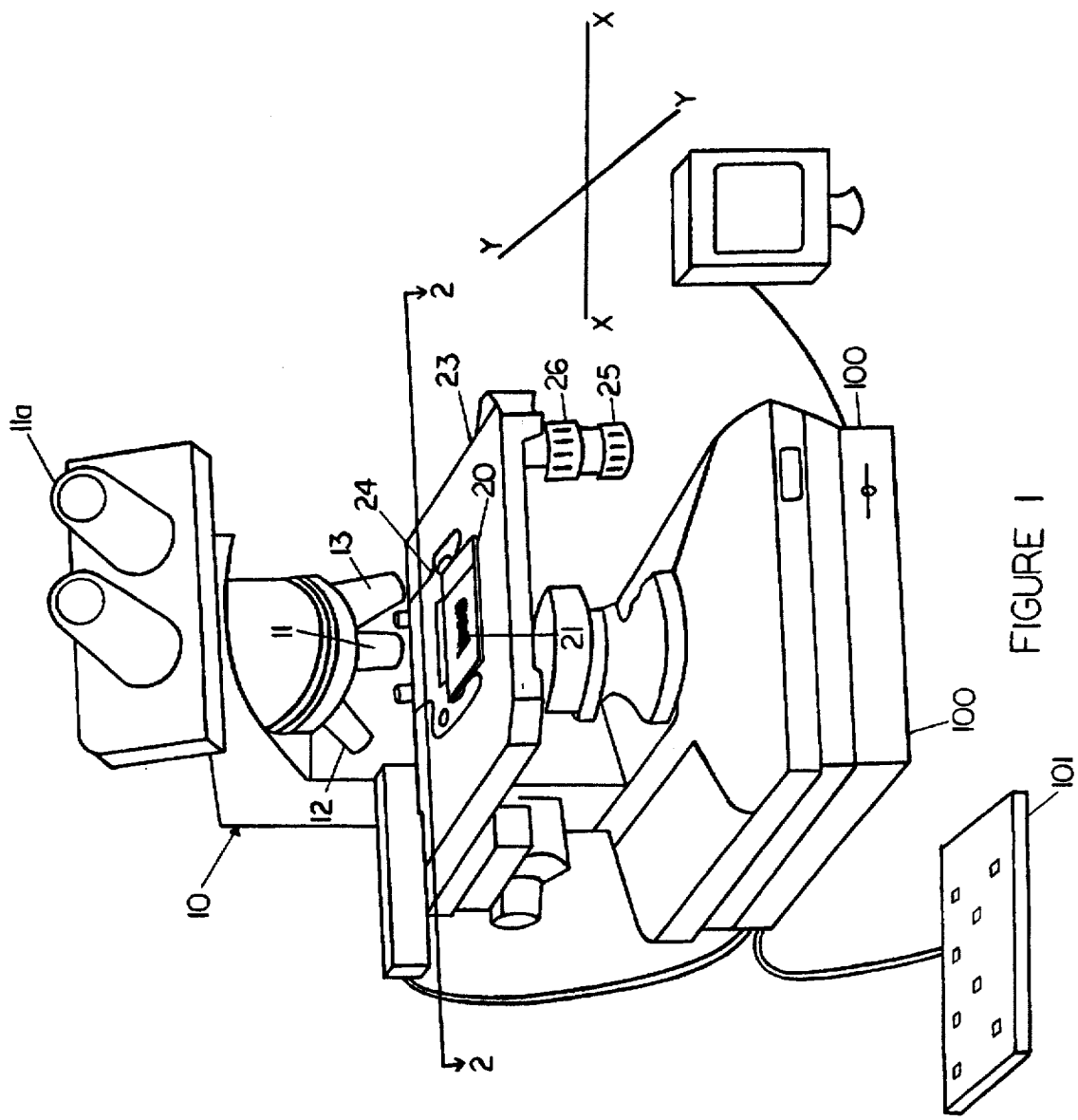
FIG. 1 depicts a typical microscope with a slide stage, movable in an x-y axes plane and a slide holder.
Figure 2:
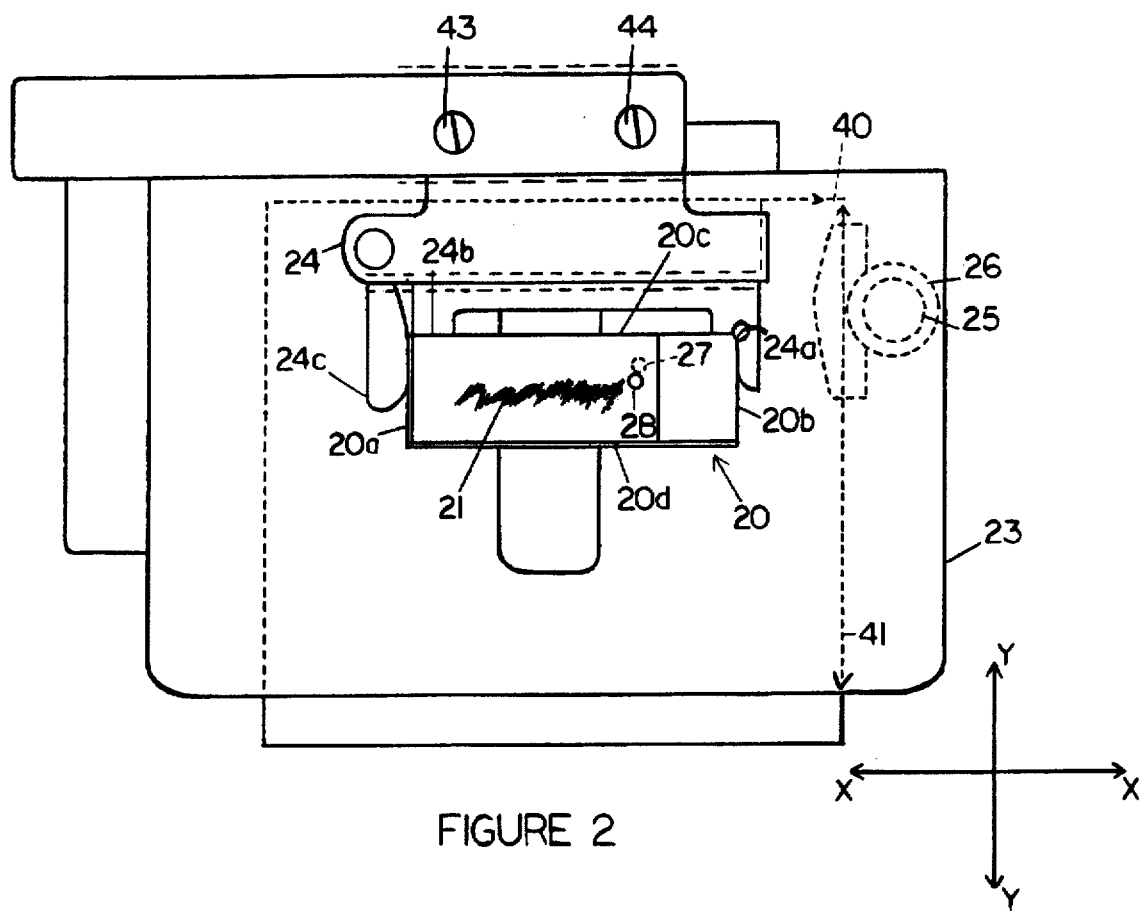
FIG. 2 is a view taken along line 2—2 of FIG. 1, showing a slide, with specimen, positioned for viewing, with indication of possible deviations from orthogonality.
Figure 3:
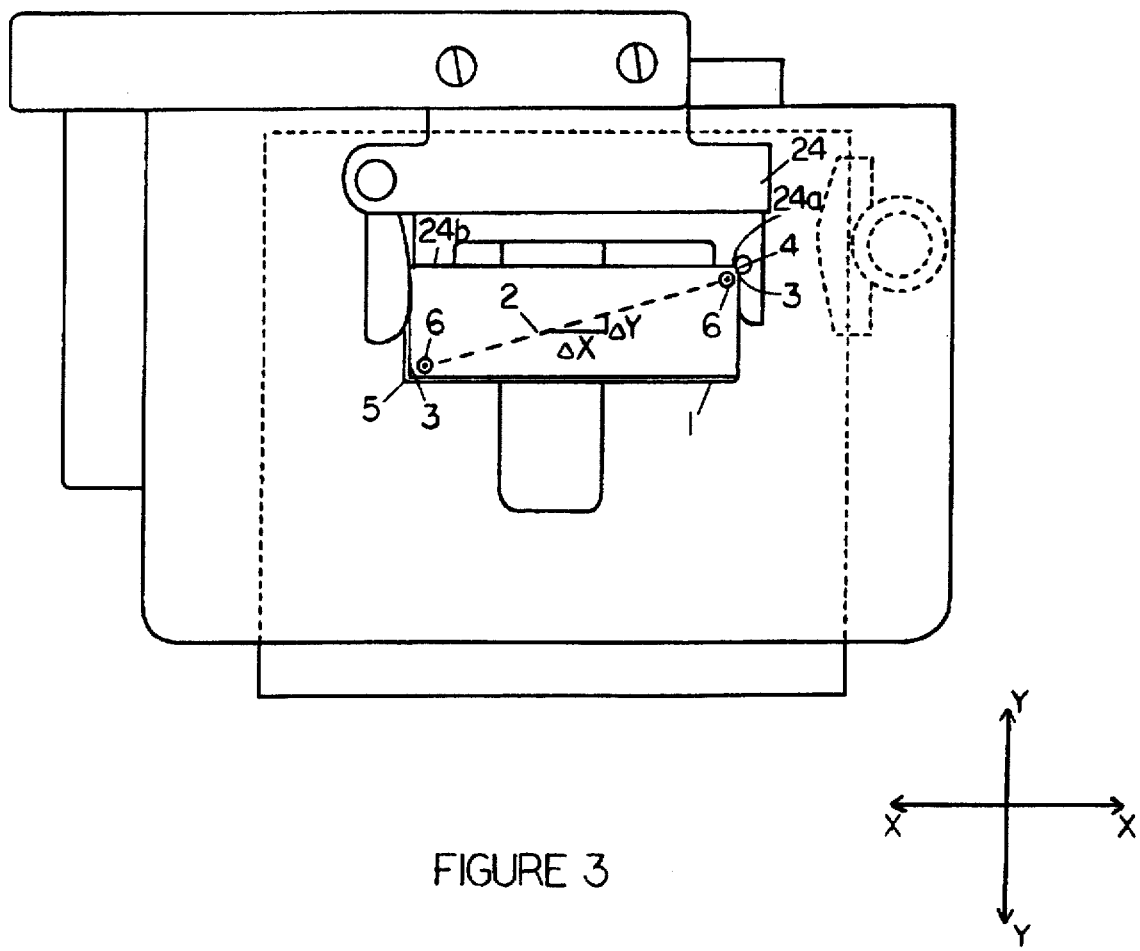
FIG. 3 is a view similar to that of FIG. 2, but with a calibration slide of the present invention positioned thereon.
Figure 4:
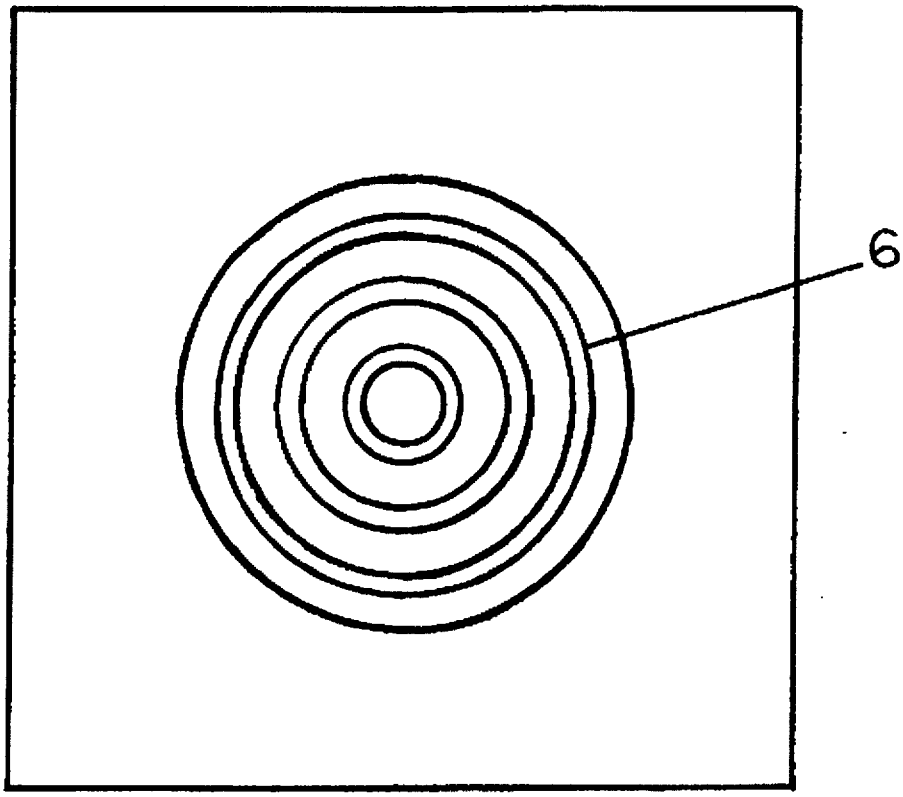
FIG. 4 depicts the view through the microscope lens for fixing the diagonal end points.

With reference to FIG. 1, typical microscope 10, as used in pathology examinations, has lenses 11, 12, and 13, of various magnification which can be separately adjusted to be in visual alignment with specimen containing portions of slide 20. Prior to initial viewing, slide 20, with specimen 21 thereon, is fixedly positioned and held on movable slide stage 23 of the microscope, by abutted insertion thereof against microscope slide holder 24. As more clearly seen in FIG. 2, the slide 20 is abuttingly placed against right angled corner 24a of slide holder 24, with the upper edge of the slide being aligned with edge 24b of the slide holder, whereby the slide is orthogonal to the slide holder. Spring clip 24c holds the left edge 20a of the slide 20 to maintain such orthogonal positioning.

Slide stage 23 is movable in the x-y axis plane as shown, by manipulation of controls 25 and 26 for the x and y axis movements respectively. Such movement enables all portions of the specimen on the slide to be viewable as desired. Ideally, the slide holder 24 and therefore the slide 20, held thereby, are orthogonal to the respective x and y axes, whereby x-axis movement of the slide stage tracks across the slide 20 between the lateral edges 20a and 20b of the slide, with a track 40 which is parallel to upper and lower edges 20c and 20d of the slide. Similarly, tracking between upper and lower edges 20c and 20d, with y-axis movement, provides a track 41 which is parallel to lateral edges 20a and 20b. Any position on the slide is thereby accessible by combination of x-axis and y-axis movements, with such movement and viewing positions, being continuously monitored by computer and recorded, as described in co-pending application Nos. 08/089,243. While the holder 24 itself is machined to exacting tolerances, to provide an orthogonal holding of the slide relative to itself, the slide holder is attached to the microscope stage such as with screws 43 and 44, which permit slight deviations (on the order of several millimeters) from orthogonality of the slide holder (and the slide and specimen held therewith) relative to the slide stage, as indicated by the dashed line. When the deviation from orthogonality is extrapolated to the viewing position of specimen, it can result in complete removal of an expected area 27 from the actual viewing site 28. While this is not of any concern with manual viewing and recordation of events of interest on the specimen with ink dots, it is detrimental to accurate review of slides by computerized location and relocation, since accurate starting points for the location and relocation have not been established. In this latter regard, initial slide screening on one microscope with computerized viewing area location recordation, includes the orthogonal deviation, if any, of the first microscope, which may then be additive to a further deviation on a different microscope, used for re-screening.

In accordance with the present invention and with reference to FIGS. 3–6, a calibration slide 1 is utilized to correct for all instances of deviations from orthogonality, whereby only a single, preferably true orthogonal location of specimen sites, is recorded and thereafter calibrated for accurate review with other microscopes having additional deviations. The initial screening and subsequent re-screenings are calibrated to the same orthogonality.

Figure 6:
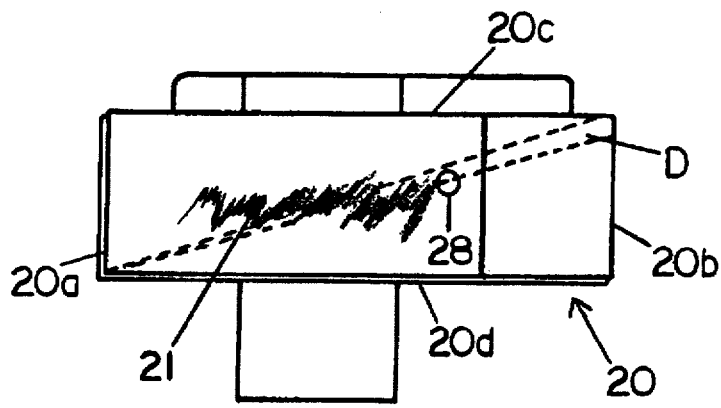
FIG. 6 schematically depicts the correction from a computer retrieved location site on the specimen to a corrected one.
Figure 5:
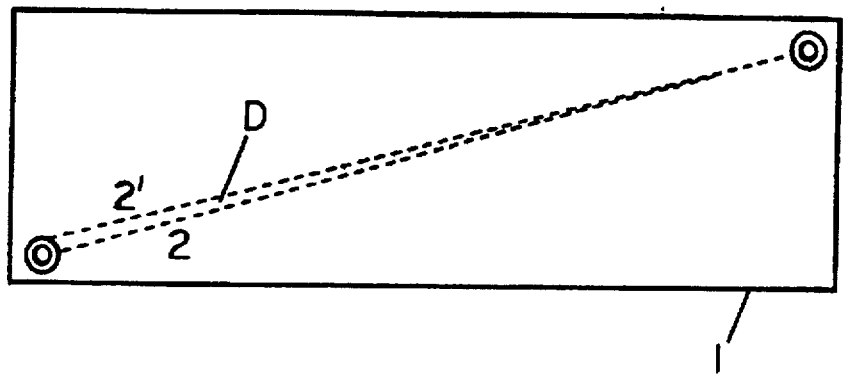
FIG. 5 depicts the determined diagonal relative to the true orthogonal slope.

As shown, for calibration of slides (and/or specimens) for initial screening and all subsequent re-screenings, calibration slide 1, is positioned against the fixed right angled upper right hand corner 24a of slide holder 24 and the upper end of the slide is aligned with edge 24b of the slide holder. Calibration slide 1 has a predetermined length for diagonal 2, with a predetermined slope ($\Delta y/\Delta x$) based on true orthogonality which is contained in memory of computer 100, correlatively attached to the slide stage 23. Deviation from orthogonality is determined by moving the viewfinder 11a of lens 11 to superimpose and enter a calibration mark 3 directly on two opposite corners 4,5 of the calibration slide 1, or on location marks 6 on the calibration slide, which are a pre-set distance from such opposite corners. Entry of the corner positions, via keyboard 101 locates a diagonal line 2' of the appropriate length and of a particular slope, relative to the x-y axes of microscope stage movement. Deviation D of the slope of the obtained diagonal line 2' from the slope of the predetermined diagonal line 2 is calculated and used to compensate for deviations of specimen event locations from orthogonally based locations, as depicted in FIG. 6. Such deviation correction is effected in initial recording of specific positions of the specimen, and in all subsequent re-screenings, to provide a uniform basis for location and relocation of specimen events, regardless of the nature of the particular microscope being utilized.

It is understood that changes may be made in structure, markings and procedure in effecting the requisite calibrations, without departing from the scope of the present invention as defined in the following claims. Though the invention has been exemplified and the drawings show the use of a calibration slide, other similar devices with predetermined slope measurements, relative to a fixed line, may be similarly utilized for calibration purposes for specimens of like kind.

What is claimed is:

1. A method for calibration of a specimen holder in a fixed position relative to a movable stage of a microscope, with said stage having x-y axes of movement; for use in accurate and repeatable position location and relocation of specific areas of a specimen held by said holder, with said microscope; said method comprising the steps of:

a. determining any deviation of the specimen holder and a specimen thereon, from orthogonal positioning thereof, relative to the x-y axes of the movement of the stage;

b. utilizing the determined deviation to correct computer recordation of location of events of said specimen as a true orthogonally positioned specimen relative to said x-y axes;

c. whereby the determined deviation is capable of being utilized to correctly relocate events of said specimen from computer stored location of events of said specimen on a true orthogonally positioned specimen relative to said x-y axes, and, wherein said deviation is determined by the steps of:

a. placing a calibration slide in said holder in said fixed position on the stage, with said calibration slide being rectangular and having a diagonal of predetermined slope when positioned in a true orthogonal position relative to x-y axes;

b. recording two positions on the calibration slide whereby the position and slope of the diagonal of the calibration slide, as positioned, is determined; and c. comparing the predetermined slope and the determined slope and calculating the deviation of the determined slope from the predetermined slope.

2. The method of claim 1, wherein said two positions comprise diagonally opposed corners of the slide.

3. The method of claim 1, wherein said two positions comprise marked positions on the calibration slide, each being of pre-calculated distance and relative position from the diagonal of the calibration slide.

4. The method of claim 3, wherein said two positions are recorded when an image within a lens of the microscope is separately superimposed on each of the diagonally opposed corners of the slide.

5. The method of claim 1, wherein said two positions are recorded When an image within a lens of the microscope is separately superimposed on each of the diagonally opposed corners of the slide.

6. The method of claim 1, wherein said two positions are recorded when an image within a lens of the microscope is separately superimposed on specified markings on the calibration slide.

7. The method of claim 1, wherein the length of the actual diagonal of the calibration slide is pre-determined and wherein the length of the determined diagonal is compared to the actual length, and wherein significant deviations therebetween effects a rejection of said calibration.

8. A device for use in calibration in accordance with the method of claim 1, comprising a calibration slide having a diagonal of predetermined slope relative to a true orthogonal placement thereof relative to x-y axes of the stage; computer means having the pre-determined slope recorded therein; means for recording the two positions on the calibration slide for determination of the actual slope; means for comparing the predetermined slope and the determined slope and calculating the variation therebetween and means for utilizing said variation in calibrating actual position of events in the specimen to a position of a specimen correspondingly positioned in a true orthogonal position relative to said x-y axes.

9. The device of claim 8, wherein said calibration slide comprises marked portions thereof corresponding to said two positions.

\* \* \* \* \*

UNITED STATES PATENT AND TRADEMARK OFFICE
CERTIFICATE OF CORRECTION

PATENT NO.  : 5,694,212
DATED       : December 2, 1997
INVENTOR(S) : Weissman

It is certified that error appears in the above-identified patent and that said Letters Patent is hereby corrected as shown below:

Column 3, line 12, delete the phrase "based-entry" and replace it with -- based entry --.

Column 5, line 20 (Claim 5), delete "When" and replace it with -- when --.

Signed and Sealed this

Ninth Day of February, 1999

Attest:

Attesting Officer

Acting Commissioner of Patents and Trademarks